United States Patent
Hu et al.

(10) Patent No.: US 9,787,217 B2
(45) Date of Patent: Oct. 10, 2017

(54) POWER CONVERSION CIRCUIT AND POWER CONVERSION SYSTEM

(71) Applicant: HUAWEI TECHNOLOGIES CO., LTD., Shenzhen, Guangdong (CN)

(72) Inventors: Yanshen Hu, Shenzhen (CN); Yunfeng Liu, Shanghai (CN); Lei Shi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 168 days.

(21) Appl. No.: 14/542,302

(22) Filed: Nov. 14, 2014

(65) Prior Publication Data

US 2015/0062984 A1 Mar. 5, 2015

Related U.S. Application Data

(63) Continuation of application No. PCT/CN2014/072557, filed on Feb. 26, 2014.

(30) Foreign Application Priority Data

Aug. 30, 2013 (CN) .......................... 2013 1 0390675

(51) Int. Cl.
H02M 7/49 (2007.01)
H02M 7/493 (2007.01)
(Continued)

(52) U.S. Cl.
CPC ............... *H02M 7/49* (2013.01); *H02M 1/12* (2013.01); *H02M 7/23* (2013.01); *H02M 7/487* (2013.01);
(Continued)

(58) Field of Classification Search
CPC ........ H02M 7/487; H02M 7/49; H02M 7/493; H02M 7/497; H02M 7/66; H02M 7/797;
(Continued)

(56) References Cited

U.S. PATENT DOCUMENTS 5,245,525 A  9/1993  Galloway et al.
5,852,554 A  12/1998  Yamamoto
(Continued)

FOREIGN PATENT DOCUMENTS

CN  1067188 C   6/2001
CN  1845433 A   10/2006
(Continued)

OTHER PUBLICATIONS

Keiju Matsui et al, "Application of parallel Connected NPC-PWM Inverters with Multilevel Modulation for AC motor Drive", Sep. 2000, total 7 pages.
(Continued)

*Primary Examiner* — Fred E Finch, III
(74) *Attorney, Agent, or Firm* — Leydig, Voit & Mayer, Ltd.

(57) ABSTRACT

A power converter, includes a first terminal and a second terminal which are connected to a direct current; a third terminal connected to an alternating current; N multi-level bridge arms connected in parallel to the first terminal and the second terminal, where the N multi-level bridge arms work in a parallel-interleaved manner, each multi-level bridge arm of the N multi-level bridge arms includes an alternating current node, and multiple time-varying levels are generated at the alternating current node, where the multiple levels are more than two levels; and a coupling inductor, including N windings coupled by one common magnetic core, where one end of each winding of the N windings is connected to an alternating current node of one multi-level bridge arm of the N multi-level bridge arms, and the other end of each winding of the N windings is connected to the third terminal.

13 Claims, 12 Drawing Sheets

(51) Int. Cl.
*H02M 1/12* (2006.01)
*H02M 7/23* (2006.01)
*H02M 7/487* (2007.01)
*H02M 1/00* (2006.01)

(52) U.S. Cl.
CPC .... *H02M 7/493* (2013.01); *H02M 2001/0064* (2013.01)

(58) Field of Classification Search
CPC .. H02M 7/81; H02M 1/12; H02M 2001/0064; H02M 7/23
See application file for complete search history.

(56) References Cited

U.S. PATENT DOCUMENTS

| | | | |
|---|---|---|---|
| 6,545,450 | B1 | 4/2003 | Ledenev et al. |
| 8,009,003 | B2 | 8/2011 | Laboure et al. |
| 2002/0136029 | A1 | 9/2002 | Ledenev et al. |
| 2002/0145896 | A1 | 10/2002 | Caruthers et al. |
| 2004/0071003 | A1* | 4/2004 | Cocconi ............... H02M 1/12 363/132 |
| 2008/0074911 | A1 | 3/2008 | Petter |
| 2008/0218150 | A1 | 9/2008 | Meynard et al. |
| 2009/0046482 | A1 | 2/2009 | Smith |
| 2009/0244936 | A1 | 10/2009 | Falk et al. |
| 2010/0109582 | A1* | 5/2010 | Terode ............... H02M 7/49 318/400.2 |
| 2011/0128763 | A1 | 6/2011 | Iwata et al. |
| 2011/0235376 | A1* | 9/2011 | Feng ............... H02M 7/483 363/65 |
| 2013/0229838 | A1* | 9/2013 | Wang ............... H02M 7/493 363/40 |
| 2013/0314957 | A1* | 11/2013 | Gupta ............... H02M 7/483 363/71 |
| 2014/0152413 | A1* | 6/2014 | Fu ............... H02M 7/493 336/192 |
| 2014/0362626 | A1 | 12/2014 | Kidera |

FOREIGN PATENT DOCUMENTS

| | | | |
|---|---|---|---|
| CN | 101783611 A | 7/2010 | |
| CN | 102624266 A | 8/2012 | |
| CN | 102655379 A | 9/2012 | |
| CN | 102739033 A | 10/2012 | |
| CN | 202798002 U | 3/2013 | |
| CN | 103475248 A | 12/2013 | |
| DE | WO 2009003959 A2 * | 1/2009 | ............. H02M 7/49 |
| EP | 0430044 A2 | 6/1991 | |
| EP | 2536018 A1 | 12/2012 | |
| JP | S57170072 A | 10/1982 | |
| JP | H10323052 A | 12/1998 | |
| JP | 2000224862 A | 8/2000 | |
| JP | 2001211660 A | 8/2001 | |
| JP | 2002542751 A | 12/2002 | |
| JP | 2006304530 A | 11/2006 | |
| JP | 2007014361 A | 1/2007 | |
| JP | 2009095075 A | 4/2009 | |
| WO | WO 0062409 A1 | 10/2000 | |
| WO | WO 2008102552 A1 | 8/2008 | |
| WO | 2012164099 A2 | 12/2012 | |
| WO | WO 2013099053 A1 | 7/2013 | |

OTHER PUBLICATIONS

Fuliang Tang et al, "Researching of a New Multilevel Inverter Topology", Dec. 2000, total 4 pages.
Romeu Hausmann et al: "Three-phase NPC inverter using three-phase coupled inductor",XP031629690, 2009, total 6 pages.
Rene P. T. Bascope et al: "Multi-state communication cells to increase current capacity of multi-level inverters", XP032071317, 2011, total 10 pages.
Ronny G. A. Cacau et al: "Five-level T-type inverter based on multi-state switching cell", XP032326278, 2012, total 8 pages.
David O. Boillat et al: "Modeling and experimental analysis of a Coupling Inductor employed in a high performance AC power source", XP032440255, 2012, total 18 pages.

* cited by examiner

POWER CONVERSION CIRCUIT AND POWER CONVERSION SYSTEM

CROSS-REFERENCE TO RELATED APPLICATIONS

This application is a continuation of International Application No. PCT/CN2014/072557, filed on Feb. 26, 2014, which claims priority to Chinese Patent Application No. 201310390675.7, filed on Aug. 30, 2013, both of which are hereby incorporated by reference in their entireties.

TECHNICAL FIELD

Embodiments of the present invention relate to power conversion technologies, and in particular, to a power conversion circuit and a power conversion system.

BACKGROUND

In an existing high-voltage inversion technology, a high-voltage converter, which is based on a direct serial connection of power electronic components, has a high requirement for dynamic and static equalizer circuits, and also has a high proportion of high-order harmonics in its output voltage, which makes it necessary to set an output filter. The proposition of a multi-level inverter circuit is a breakthrough progress for solving the above-mentioned problem. In a general structure of a multi-level inverter, typically, several level steps are combined into a step wave to approximate a sinusoidal output voltage. Due to the increased number of levels of the output voltage, the inverter reduces the proportion of harmonics in an output waveform and diminishes a voltage stress on a switch, so that an equalizer circuit is unneeded. For example, a switching tube is used to aid a neutral-point-clamped three-level inverter circuit, a diode clamped inverter circuit and a multi-level inverter which is mainly applied to such fields as speed control of a high-voltage high-power motor, reactive compensation, and active filtering.

Based on the three-level inverter circuit, more output levels can be implemented by adding more power semiconductors or by connecting low-level topologies in series. However, because the control logic of the inverter circuit in the solution is complicated, the solution is hard to implement.

SUMMARY

Embodiments of the present invention provide a power conversion circuit and a power conversion system, which can simplify the control logic of a power conversion circuit.

According to a first aspect, a power conversion circuit is provided, including: a first terminal and a second terminal, which are configured to connect to a direct current; a third terminal, configured to connect to an alternating current; N multi-level bridge arms, connected in parallel between the first terminal and the second terminal, and configured to work in a parallel-interleaved manner, where the working in a parallel-interleaved manner refers to working in a phase-interleaved manner, and multiple time-varying levels are generated at an alternating current node of each multi-level bridge arm of the N multi-level bridge arms, where the multiple levels are more than two levels; and a coupling inductor, including N windings coupled by one common magnetic core, and configured to form inductances coupled with each other, where one end of each winding of the N windings is connected to an alternating current node of one multi-level bridge arm of the N multi-level bridge arms, and the other end of each winding of the N windings is connected to the third terminal, where N is greater than or equal to two.

In a first possible implementation manner, the common magnetic core includes N inter-connected cylinders, where the N windings wind around the N cylinders respectively in a same winding direction.

In a second possible implementation manner, the N windings have the same number of turns.

In a third possible implementation manner, the power conversion circuit according to the first aspect further includes: a driving circuit, configured to generate a driving signal to control the N multi-level bridge arms to work in a 360/N-degree-phase-interleaved manner within a switching cycle of the driving signal of the power conversion circuit.

With reference to the third possible implementation manner, in a fourth possible implementation manner, the driving signal has a duty cycle within multiple preset ranges, where the multiple preset ranges include [(n−1)/N, n/N], where n [(n−1)/N, n/N].

In a fifth possible implementation manner, the multi-level bridge arms are M-level bridge arms, and the N multi-level bridge arms generate (M−1)*N+1 levels.

In a sixth possible implementation manner, the power conversion circuit according to the first aspect further includes: a filter circuit, connected to the third terminal and configured to filter the alternating current; and a bleeder circuit, connected between the first terminal and the second terminal and configured to bleed down a voltage of the direct current.

With reference to the sixth possible implementation manner, in a seventh possible implementation manner, the multi-level bridge arm is a neutral-point-clamped multi-level bridge arm, where a neutral point of the bleeder circuit is connected to a clamped neutral point of each multi-level bridge arm of the N multi-level bridge arms.

With reference to the sixth possible implementation manner, in an eighth possible implementation manner, the filter circuit is a capacitor.

In a ninth possible implementation manner, the multi-level bridge arms are capacitor-clamped multi-level bridge arms.

With reference to any one of the foregoing possible implementation manners, in a tenth possible implementation manner, the power conversion circuit is an inverter, configured to convert the direct current into an alternating current, where the first terminal and the second terminal are input terminals and the third terminal is an output terminal.

With reference to any one of the first to ninth implementation manners of the first aspect, in an eleventh possible implementation manner, the power conversion circuit is a rectifier, configured to convert the alternating current into a direct current, where the third terminal is an input terminal and the first terminal and the second terminal are output terminals.

According to a second aspect, a three-phase power converter is provided, including: a three-phase power conversion circuit, configured to perform power conversion between a three-phase alternating current and a direct current, where each phase of power conversion circuit is the power conversion circuit according to the first aspect.

In a first possible implementation manner, the three-phase power converter according to the second aspect further includes: a bleeder circuit, connected between a first terminal and a second terminal of each phase of power conversion circuit, and configured to bleed down a voltage of the direct current; and a three-phase filter circuit, including three capacitors and configured to filter the three-phase alternating current, where one end of each of three capacitors is connected to a third terminal of one phase of power conversion circuit of a three-phase power conversion circuit, and the other ends of the three capacitors are connected together.

With reference to the first possible implementation manner of the second aspect, in a second possible implementation manner, the other ends of the three capacitors are connected together to a neutral point of the bleeder circuit.

With reference to the second possible implementation manner of the second aspect, in a third possible implementation manner, the three-phase power converter according to the second aspect further includes: a first neutral, configured to connect to a neutral of a grid, where the first neutral is connected to the ends of the three capacitors that are connected together.

According to a third aspect, a power conversion system is provided, including: M power conversion circuits, configured to perform power conversion between an alternating current and a direct current, where each power conversion circuit of the M power conversion circuits is the power conversion circuit according to the first aspect; a bleeder circuit, connected between a first terminal and a second terminal of each power conversion circuit of the M power conversion circuits, and configured to bleed down a voltage of the direct current; a fourth terminal; a coupling inductor, including M windings coupled by one common magnetic core, and configured to form inductances coupled with each other, where one end of each of the M windings is connected to a third terminal of one power conversion circuit of the M power conversion circuits, and the other end of each of the M windings is connected to the fourth terminal; and a filter circuit, connected to the fourth terminal and configured to filter the alternating current, where M is greater than or equal to two.

In a first possible implementation manner, the filter circuit includes a capacitor connected to the fourth terminal.

In a second possible implementation manner, N multi-level bridge arms of each power conversion circuit of the M power conversion circuits work in a parallel-interleaved way in a 360/(N*M)-degree-phase-interleaved manner within a switching cycle of a driving signal of the power conversion circuit.

According to a fourth aspect, a power conversion system is provided, including: a first power conversion circuit, which is the power conversion circuit according to the tenth possible implementation manner of the first aspect, and is configured to convert a direct current into an alternating current, where a first terminal and a second terminal are input terminals, and a third terminal is an output terminal; and a second power conversion circuit, which is the power conversion circuit according to the tenth possible implementation manner of the first aspect, and is configured to convert an alternating current into a direct current, where the output terminal of the first power conversion circuit is connected to the input terminal of the second power conversion circuit, or the output terminals of the second power conversion circuit are connected to the input terminals of the first power conversion circuit.

In the technical solution of the present invention, by using multiple parallel-interleaved multi-level bridge arms in combination with a coupling inductor, multiple alternating current levels can be generated at an alternating current node of each multi-level bridge arm, and more alternating current levels can be generated at an alternating current terminal connected to the coupling inductor. Because the multiple multi-level bridge arms can increase output levels in a phase-interleaved working manner, the control logic of a power conversion circuit is simplified.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A parallel-interleaving technique is an effective solution to improve a power capacity of a power converter. Using a parallel-interleaving solution can conveniently increase the power class of a converter and reduce input and output current ripples; in addition, it can also accelerate the dynamic response of the converter, reduce the volume of magnetic elements in a circuit, and implement automatic current equalization of the converter. Although a multi-level output topology can be implemented by using parallel-interleaved two-level bridge arms in combination with a coupling inductor, this solution requires a filter circuit to filter an output multi-level waveform, which is adverse to suppression of high-order harmonics.

Figure 1:
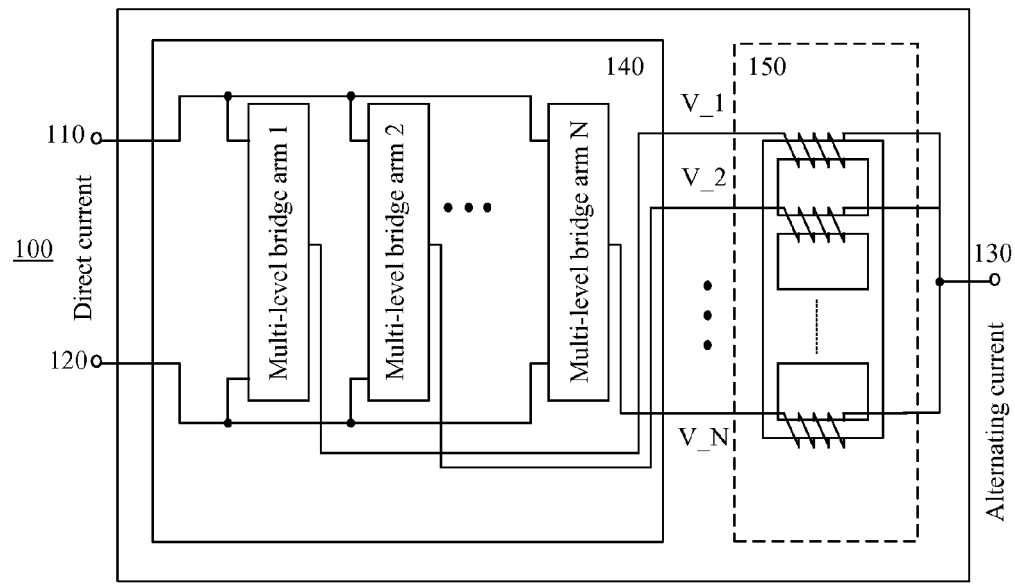
FIG. 1 is a schematic block diagram of a power conversion circuit according to an embodiment of the present invention.

FIG. 1 is a schematic block diagram of a power conversion circuit 100 according to an embodiment of the present invention. The power conversion circuit 100 includes: a first terminal 110, a second terminal 120, a third terminal 130, N multi-level bridge arms 140 and a coupling inductor 150.

The first terminal 110 and the second terminal 120 are connected to a direct current. The third terminal 130 is connected to an alternating current. The N multi-level bridge arms 140 include a multi-level bridge arm 1, a multi-level bridge arm 2, . . . , and a multi-level bridge arm N, which are connected in parallel between the first terminal 110 and the second terminal 120, where the N multi-level bridge arms 140 work in a parallel-interleaved manner, where the working in a parallel-interleaved manner refers to working in a phase-interleaved manner, and multiple time-varying levels are generated at an alternating current node of each multi-level bridge arm of the N multi-level bridge arms 140, where the multiple levels are more than two levels. The coupling inductor 150 includes N windings coupled by one common magnetic core, and is configured to form inductances coupled with each other, where one end of each winding of the N windings is connected to an alternating current node of one multi-level bridge arm of the N multi-level bridge arms, and the other end of each winding of the N windings is connected to the third terminal 130, where N is greater than or equal to two.

According to the embodiment of the present invention, the power conversion circuit 100 may be a rectifier circuit or an inverter circuit. For example, if the first terminal and the second terminal are input terminals and the third terminal is an output terminal, the power conversion circuit 100 is an inverter circuit. On the contrary, if the third terminal is an input terminal and the first terminal and the second terminal are output terminals, the power conversion circuit 100 is a rectifier circuit.

A multi-level bridge arm is also referred to as a multi-level topology, including multiple switching tubes, where the multiple switching tubes may be turned on or off under the control of driving signals in a complementary way, so as to generate multiple time-varying levels at an alternating current node of the multi-level bridge arm, or present multiple time-varying levels at the alternating current node. Parallel-interleaving refers to a situation in which multiple multi-level bridge arms work in parallel, and phases of driving signals of the multiple multi-level bridge arms are spaced by a preset angle, for example, 360/N degrees. For example, the N multi-level bridge arms 140 may work in a manner of phase interleaving by an angle of preset degrees. For example, phases of driving signals of three three-level bridge arms are spaced by 120 degrees, and phases of driving signals of five three-level bridge arms are spaced by 72 degrees.

According to the embodiment of the present invention, the N windings are coupled by one common magnetic core to form the coupling inductor, the N multi-level bridge arms are connected to the N windings of the coupling inductor, so as to combine multiple levels generated by each multi-level bridge arm of the N multi-level bridge arms into more levels by using the coupling inductor. For example, a power conversion circuit including three three-level bridge arms can generate seven levels at the third terminal connected to the coupling inductor. For another example, a power conversion circuit including three five-level bridge arms can generate thirteen levels at the third terminal connected to the coupling inductor.

It should be understood that phases of driving signals of two adjacent multi-level bridge arms may be spaced by a same angle, for example, 360/N degrees, or by different angles. In the embodiment of the present invention, setting the phase spacing to a same angle simplifies a method for controlling the multi-level bridge arms.

In the technical solution of the present invention, by using multiple parallel-interleaved multi-level bridge arms in combination with a coupling inductor, multiple alternating current levels can be generated at an alternating current node of each multi-level bridge arm, and more alternating current levels can be generated at an alternating current terminal connected to the coupling inductor. Because the multiple multi-level bridge arms can increase output levels in a phase-interleaved working manner, the control logic of a power conversion circuit is simplified.

Moreover, because in the embodiment of the present invention the number of alternating current levels can be increased, the proportion of high-order harmonics in an alternating current is reduced, thereby suppressing the high-order harmonics effectively.

In addition, because the high-order harmonics are suppressed effectively, it is unnecessary to perform filtering by using a larger filter circuit, thereby reducing the cost of the filter circuit.

According to the embodiment of the present invention, the multi-level bridge arm is a neutral-point-clamped multi-level bridge arm or a capacitor-clamped multi-level bridge arm. In the embodiment of the present invention, the multi-level bridge arm is not limited to the two types of multi-level bridge arms, for example, may also be a hybrid multi-level bridge arm.

According to the embodiment of the present invention, the multi-level bridge arms are M-level bridge arms, and the N multi-level bridge arms generate (M−1)*N+1 levels. For example, the multi-level bridge arms are three-level bridge arms, and the N multi-level bridge arms generate 2N+1 levels. For example, three three-level bridge arms generate seven levels, and five three-level bridge arms generate 13 levels.

According to the embodiment of the present invention, the N windings have the same number of turns. Using the solution of setting N windings with the same number of turns can reduce ripple currents, thereby further suppressing the high-order harmonics.

According to the embodiment of the present invention, the common magnetic core includes N interconnected cylinders, where the N windings wind around the N cylinders respectively in a same winding direction. In other words, the N multi-level bridge arms may be connected respectively to dotted terminals of the N windings. Because such coupling inductor structure can generate a leakage inductance, it is unnecessary to set an inductance in the filter circuit, thereby reducing the cost of the filter circuit.

According to the embodiment of the present invention, the power conversion circuit 100 in FIG. 1 further includes: a driving circuit, which is configured to generate a driving signal to control the N multi-level bridge arms to work in a 360/N-degree-phase-interleaved manner within a switching cycle of the driving signal of the power conversion circuit. In other words, the N multi-level bridge arms may work according to driving signals with a same driving waveform (or pulse), but phases of driving signals of adjacent multi-level bridge arms differ by 360/N degrees. For example, the driving signal may be a pulse width modulation (Pulse Width Modulation, PWM) signal.

According to the embodiment of the present invention, the driving signal has a duty cycle within multiple preset ranges, where the multiple preset ranges include [(n−1)/N, n/N], where n [(n−1)/N, n/N]. An output state of multiple levels of the third terminal depends on the preset ranges of the duty cycle. By adjusting the duty cycle of the driving signal, levels generated by each multi-level bridge arm can be combined into more levels at the third terminal.

Figure 2:
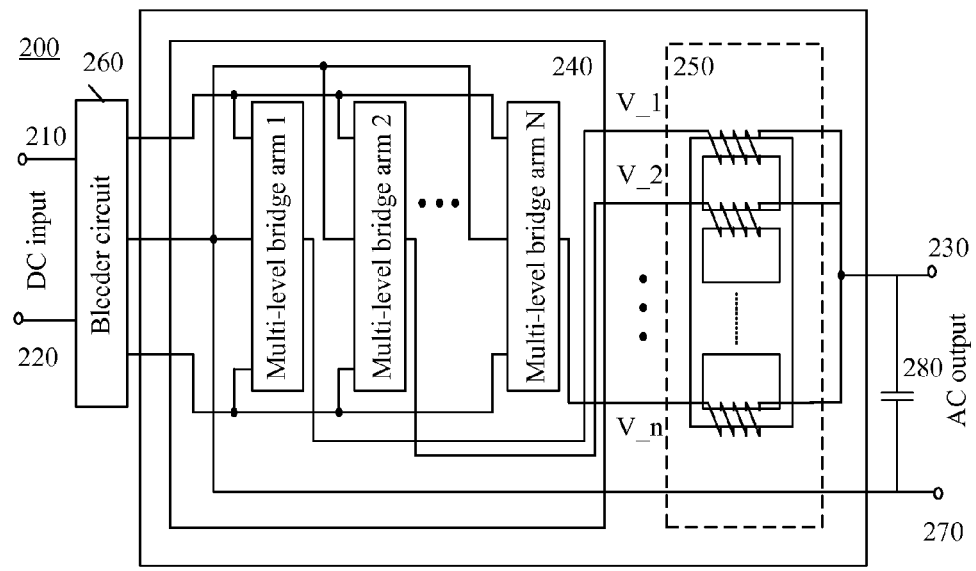
FIG. 2 is a schematic block diagram of a power conversion circuit according to another embodiment of the present invention.

FIG. 2 is a schematic block diagram of a power conversion circuit 200 according to another embodiment of the present invention. The power conversion circuit 200 includes: a first terminal 210, a second terminal 220, a third terminal 230, N multi-level bridge arms 240 and a coupling inductor 250. The power conversion circuit 200 is similar to the power conversion circuit 100 in FIG. 1, and therefore a detailed description is omitted appropriately herein.

The power conversion circuit in FIG. 2 further includes a bleeder circuit 260, a reference voltage terminal 270 and a filter circuit 280. One end of the filter circuit 280 is connected to the third terminal 330, and the other end of the filter circuit 280 is connected to the reference voltage terminal 270, and the filter circuit 280 is configured to filter an alternating current. The bleeder circuit 260 is connected between the first terminal 210 and the second terminal 220, and configured to bleed down a voltage of a direct current. The reference voltage terminal 270 is configured to receive a reference voltage. For example, the reference voltage terminal is connected to a neutral point of the bleeder circuit 260, and the neutral point of the bleeder circuit can receive the reference voltage. The neutral point of the bleeder circuit 260 is further connected to a clamped neutral point of a multi-level bridge arm. Under the control of driving signals with interleaved phases, a multi-level bridge arm 1, a multi-level bridge arm 2, . . . , and a multi-level bridge arm N respectively generate multi-level alternating currents V_1, V_2, . . . , and VN at their alternating current nodes. The multi-level alternating currents V_1, V_2, . . . , and VN are combined into a more-level alternating current at the third terminal after passing through the coupling inductor.

According to the embodiment of the present invention, the multi-level bridge arm is a neutral-point-clamped multi-level bridge arm, and the neutral point of the bleeder circuit is connected to a clamped neutral point of each multi-level bridge arm of the N multi-level bridge arms.

According to the embodiment of the present invention, the filter circuit 280 is a capacitor. In the embodiment of the present invention, because a leakage inductance generated by a coupling inductor is used to form a filter circuit with the capacitor 280, it is unnecessary to set an inductance in the filter circuit, so that the size and cost of the filter circuit can be reduced, thereby reducing the size of the power conversion circuit and reducing the cost of the power conversion circuit.

Optionally, as another embodiment, the filter circuit may also include an inductor. For example, the inductor (not shown) may be connected in series between the third terminal 230 and the coupling inductor 250.

According to the embodiment of the present invention, the power conversion circuit 200 is an inverter, which is configured to convert a direct current into an alternating current, where the first terminal and the second terminal are input terminals which receive direct current inputs, and the third terminal is an output terminal which outputs an alternating current.

Figure 3:
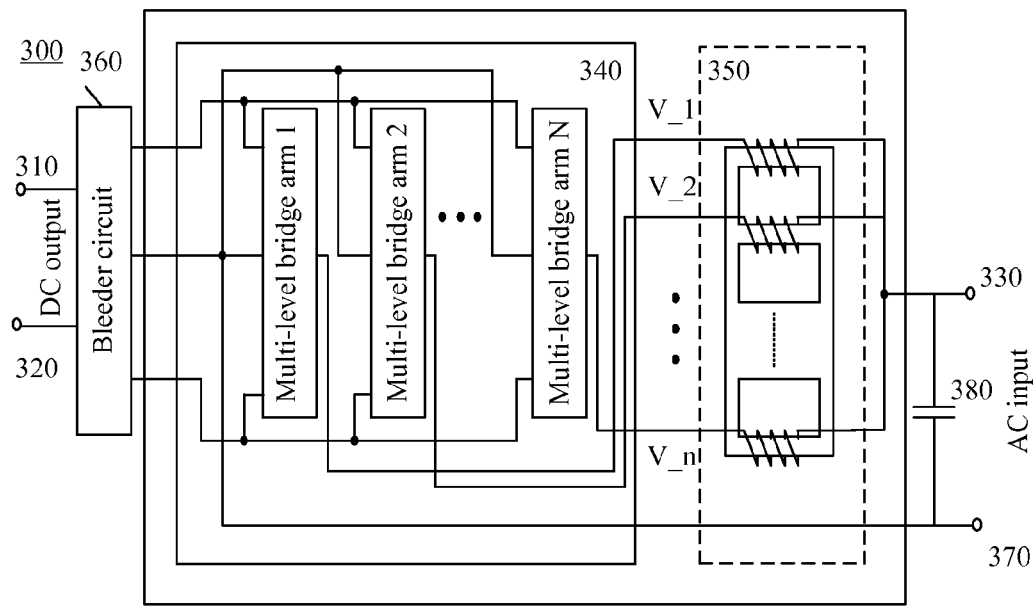
FIG. 3 is a block diagram of a power conversion circuit according to still another embodiment of the present invention.

FIG. 3 is a schematic block diagram of a power conversion circuit 300 according to still another embodiment of the present invention. The power conversion circuit 300 includes: a first terminal 310, a second terminal 320, a third terminal 330, N multi-level bridge arms 340 and a coupling inductor 350. The power conversion circuit 300 is similar to the power conversion circuit 100 in FIG. 1, and therefore a detailed description is omitted appropriately herein. The power conversion circuit in FIG. 3 further includes a bleeder circuit 360, a reference voltage terminal 370 and a filter circuit 380. One end of the filter circuit 380 is connected to the third terminal 330, and the other end of the filter circuit 380 is connected to the reference voltage terminal 370, and the filter circuit 380 is configured to filter an alternating current. The bleeder circuit 360 is connected between the first terminal 310 and the second terminal 320, and configured to bleed down a voltage of a direct current. The reference voltage terminal 370 is configured to receive a reference voltage. For example, the reference voltage terminal is connected to a neutral point of the bleeder circuit 360. The neutral point of the bleeder circuit 360 is further connected to a clamped neutral point of a multi-level bridge arm. Under the control of driving signals with interleaved phases, after an alternating current passes through the coupling inductor 350, multi-level alternating currents V_1, V_2, . . . , and V_N are generated respectively at alternating current nodes of a multi-level bridge arm 1, a multi-level bridge arm 2, . . . , and a multi-level bridge arm N.

Unlike the embodiment in FIG. 2, the power conversion circuit 300 is a rectifier, which is configured to convert an alternating current into a direct current, the third terminal 330 is an input terminal which is configured to receive an alternating current input, and the first terminal 310 and the second terminal 320 are output terminals which are configured to output direct currents.

Figure 4:
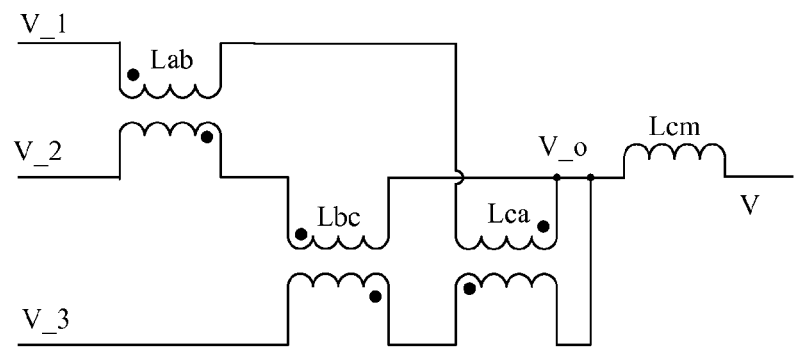
FIG. 4 is an equivalent circuit diagram of a coupling inductor according to an embodiment of the present invention.

FIG. 4 is an equivalent circuit diagram of a coupling inductor according to an embodiment of the present invention.

This embodiment is described by using an example that a coupling inductor includes three windings. It is assumed that the three windings are connected respectively to output terminals of a multi-level bridge arm A, a multi-level bridge arm B, and a multi-level bridge arm C, and that the three windings share one magnetic core. The multi-level bridge arm A, the multi-level bridge arm B and the multi-level bridge arm C work in a 360/3=120° phase-interleaved manner within a switching cycle of driving signals, that is, work in a parallel-interleaved manner where phases are interleaved by 120°. In this case, the coupling inductor may be equivalent to a working model shown in FIG. 4, where Lab, Lbc and Lca are equivalent coupling inductors, and Lcm is a leakage inductance. According to the working model of equivalent coupling inductors in FIG. 4, it can be obtained that V_o=(V_1+V_2+V_3)/3. Because the multi-level bridge arm A, the multi-level bridge arm B and the multi-level bridge arm C work in a 360/3=120° phase-interleaved manner within a switching cycle of the driving signals, the coupling inductor, when being used in an inverter circuit, may combine different states of V_1, V_2 and V_3 to obtain multiple different level states. Alternatively, when being used in a rectifier circuit, the coupling inductor may convert an input alternating current into multi-level alternating currents V_1, V_2 and V_3.

In addition, for each part of the magnetic core of the coupling inductor, different magnetic core materials may be selected according to their magnetic flux variations to make a combination.

Figure 5A:
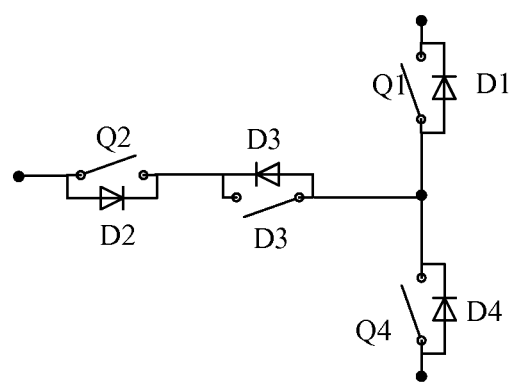
FIG. 5A is a circuit diagram of a multi-level bridge arm according to an embodiment of the present invention.
Figure 5B:
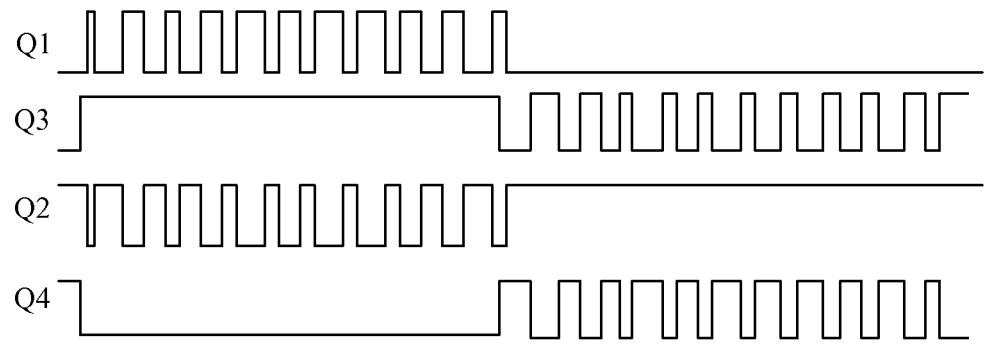
FIG. 5B is a schematic sequence diagram of a driving signal of a multi-level bridge arm according to an embodiment of the present invention.

FIG. 5A is a circuit diagram of a multi-level bridge arm according to an embodiment of the present invention. FIG. 5B is a schematic sequence diagram of a driving signal of a multi-level bridge arm according to an embodiment of the present invention.

Referring to FIG. 5A, the embodiment is described by using a neutral-point-clamped three-level bridge arm as an example. The neutral-point-clamped three-level bridge arm includes a first switch Q1 to a fourth switch Q4 as well as a first diode D1 to a fourth diode D4.

The first switching tube Q1 is connected between a first terminal of a power conversion circuit and an alternating current node of a multi-level bridge arm. The first diode D1 is connected in parallel with the first switching tube Q1, and an anode of the first diode D1 is connected to the alternating current node of the multi-level bridge arm. One end of the third switching tube Q3 is connected to the alternating current node of the multi-level bridge arm. The third diode D3 is connected in parallel with the third switching tube Q3, and an anode of the third diode D3 is connected to the alternating current node of the multi-level bridge arm. One end of the second switching tube Q2 is connected to a neutral point of a bleeder circuit, and the other end of the second switching tube Q2 is connected to the other end of the third switching tube Q3. The second diode D2 is connected in parallel with the second switching tube Q2, and an anode of the second diode Q2 is connected to the neutral point of the bleeder circuit. The fourth switching tube Q4 is connected between a second terminal of the power conversion circuit and the alternating current node of the multi-level bridge arm. The fourth diode D4 is connected in parallel with the fourth switching tube Q4, and a cathode of the fourth diode D4 is connected to the alternating current node of the multi-level bridge arm.

Referring to FIG. 5B, a control method for each three-level bridge arm is described. In a first half of each switching cycle, the third switching tube Q3 is turned on; the fourth switching tube Q4 is turned off; the first switching tube Q1 is turned on and off driven by a first pulse; and the second switching tube Q2 is turned on and off driven by a second pulse, where the first pulse and the second pulse have reversed phases. In a second half of each switching cycle, the first switching tube Q1 is turned off; the second switching tube Q2 is turned on; the third switching tube Q3 is turned on and off driven by a third pulse; and the fourth switching tube Q4 is turned on and off driven by a fourth pulse, where the third pulse and the fourth pulse have reversed phases. Table 1 shows a relationship between switching states and output voltages of the above four switching tubes.

TABLE 1

Relationship between switching states and output voltages of four switching tubes

| Q1 | Q2 | Q3 | Q4 | Output voltage |
|---|---|---|---|---|
| ON | OFF | ON | OFF | Vdc/2 |
| OFF | ON | ON | OFF | 0 |
| OFF | ON | OFF | ON | −Vdc/2 |

It can be seen from the above table that the output voltage presents three level states Vdc/2, 0 and −Vdc/2 according to different states of the switches.

It should be understood that the three-level bridge arm in FIG. 5A is just one example of a neutral-point-clamped three-level bridge arm, and there may also be other variants of the neutral-point-clamped three-level bridge arm.

Figure 5C:
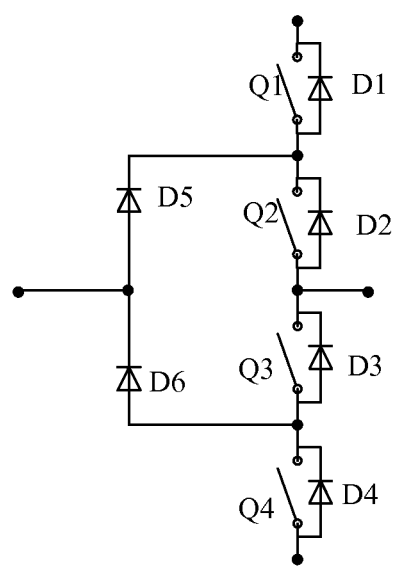
FIG. 5C is a circuit diagram of a multi-level bridge arm according to another embodiment of the present invention.

FIG. 5C is a circuit diagram of a multi-level bridge arm according to another embodiment of the present invention. By using a three-level bridge arm as an example, referring to FIG. 5C, the three-level bridge arm includes: a first switching tube Q1 to a fourth switching tube Q4; and a first diode D1 to a fourth diode D4 that are connected to the first switching tube Q1 to the fourth switching tube Q4 respectively. In addition, the three-level bridge arm further includes neutral-point-clamped diodes D5 and D6.

According to the embodiment of the present invention, a switching tube of the present invention may include, but is not limited to, a power device or a combination of different power devices, such as a metal oxide semiconductor (Metal Oxide Semiconductor, MOSFET), an insulated gate bipolar transistor (Insulated Gate Bipolar Transistor, IGBT), an integrated gate commutated thyristors (Integrated Gate Commutated Thyristors, IGCT) and a silicon controlled rectifier (Silicon Controlled Rectifier, SCR).

Figure 6:
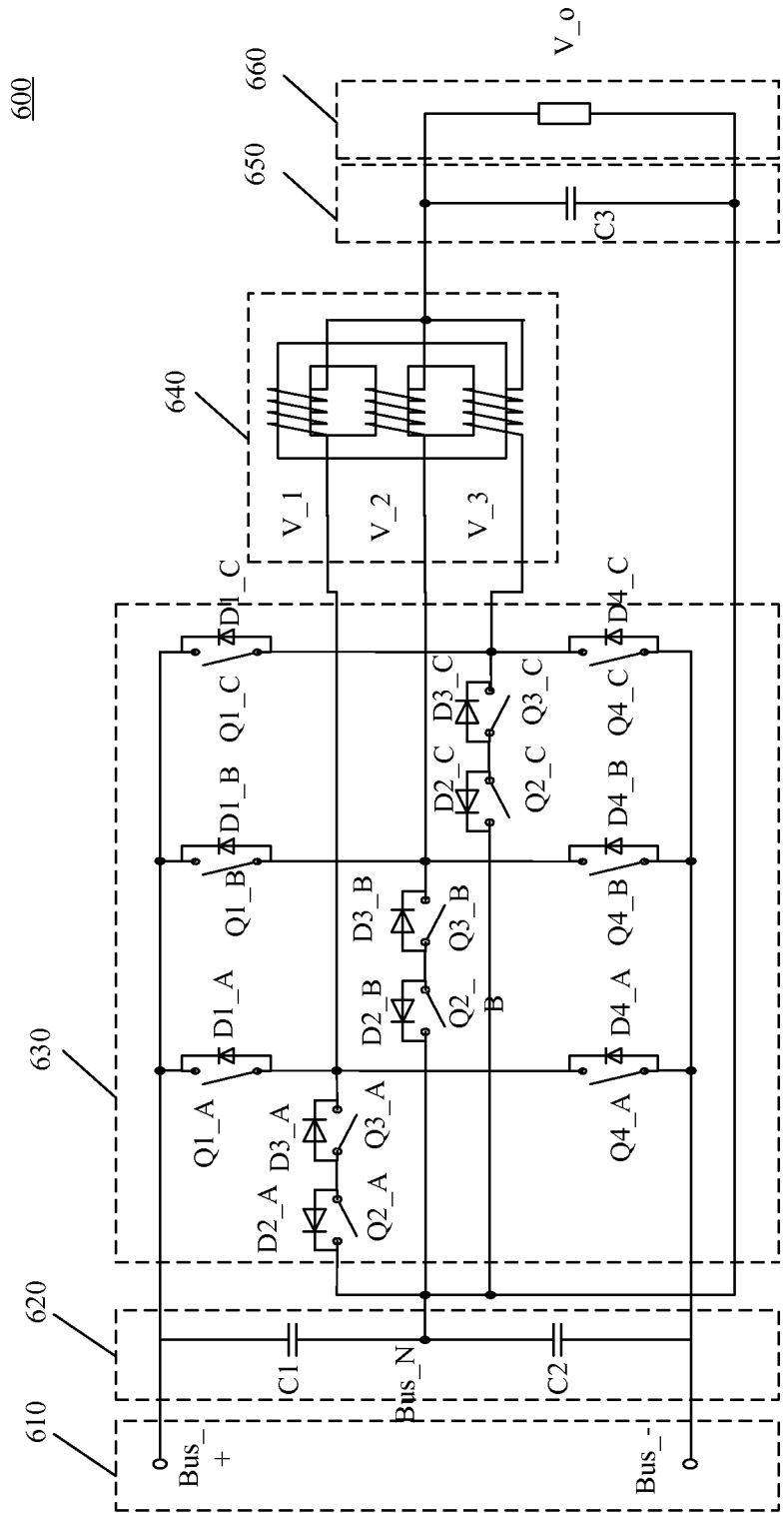
FIG. 6 is a circuit diagram of a power conversion circuit according to an embodiment of the present invention.

FIG. 6 is a circuit diagram of a power conversion circuit 600 according to an embodiment of the present invention. The power conversion circuit 600 is an example of the embodiment in FIG. 1, FIG. 2 or FIG. 3.

This embodiment is described by using an example that a power conversion circuit is a power inverter circuit and the power inverter circuit includes three neutral-point-clamped three-level bridge arms. Accordingly, a coupling inductor has three windings, but the embodiment of the present invention is not limited thereto. For example, the power conversion circuit 600 may include two three-level bridge arms or more three-level bridge arms. A circuit topology of the power conversion circuit which includes another number of three-level bridge arms is similar to a circuit topology of the power conversion circuit which includes three three-level bridge arms, and therefore is not further described herein.

The power conversion circuit 600 includes a direct current bus (Bus) 610, a bleeder circuit 620, three three-level bridge arms 630, a coupling inductor 640 and a filter circuit 650.

A first terminal of the power conversion circuit 600 is connected to an anode (Bus_+) of the direct current bus, and a second terminal of the power conversion circuit 600 is connected to a cathode (Bus_−) of the direct current bus.

The bleeder circuit includes a first capacitor C1 and a second capacitor C2, where the first capacitor C1 is connected between the Bus_+ and a neutral point Bus_N of the bleeder circuit, and the second capacitor C2 is connected between the Bus_− and the Bus_N.

The three three-level bridge arms 630 include a three-level bridge A, a three-level bridge arm B and a three-level bridge arm C. A circuit topology of each three-level bridge arm is shown in FIG. 5A and a sequence diagram of a driving signal is shown in FIG. 5B, which are not further described herein. An alternating current node of each three-level bridge arm is connected to a corresponding winding of the coupling inductor. A second switching tube Q2 and a third switching tube Q3 of each three-level bridge arm are connected in series between the Bus_N and the alternating current node of the three-level bridge arm. A first switching tube Q1 of each three-level bridge arm is connected between the Bus_+ of the direct current bus and the alternating current node of the three-level bridge arm. A fourth switching tube Q4 of each three-level bridge arm is connected between the Bus_− of the direct current bus and the alternating current node of the three-level bridge arm. The clamped neutral point of each three-level bridge arm is connected to the neutral point of the bleeder circuit. The neutral point of the bleeder circuit receives a reference voltage.

The three windings of the coupling inductor 640 share one magnetic core, where the magnetic core includes three cylinders, where two ends of each of the three cylinders are separately connected magnetically, the three windings wind respectively around the three cylinders in a same winding direction, three head ends of the three windings are connected respectively to the alternating current nodes of the three three-level bridge arms, and three tail ends of the three windings are connected to a third terminal of the power conversion circuit.

The filter circuit 650 may be a capacitor C3. The capacitor C3 is connected between the third terminal of the power conversion circuit and the neutral point of the bleeder circuit. However, the embodiment according to the present invention is not limited thereto. For example, the filter circuit 650 may also be an LC filter circuit which is formed by an inductor and a capacitor or other forms of filter circuits. The filter circuit 650 is connected to an alternating current load 660.

It should be understood that, when the power conversion circuit 600 is a rectifier, the filter circuit 650 is connected to an alternating current power supply (not shown), that is, the filter circuit 650 receives an alternating current input.

Figure 7:
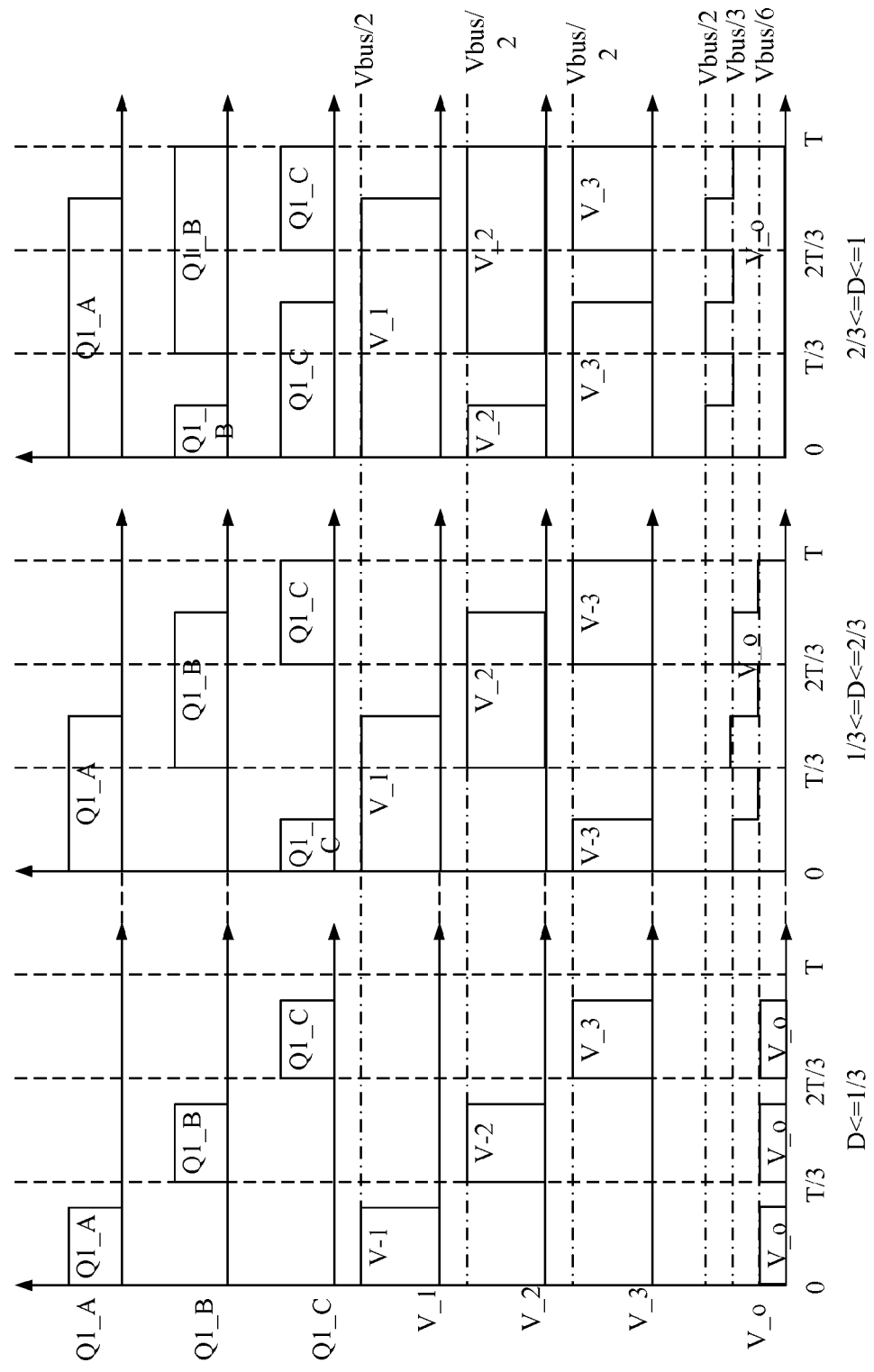
FIG. 7 is a schematic sequence diagram of a duty cycle and an output voltage of a driving signal according to an embodiment of the present invention.

FIG. 7 is a schematic sequence diagram of a duty cycle and an output voltage of a driving signal according to an embodiment of the present invention.

According to the embodiment of the present invention, by setting a proper duty cycle for a driving signal of a power conversion circuit, multiple multi-level bridge arms can generate multiple levels at alternating current nodes in a time-varying manner, and combine the multiple levels at a coupling inductor to obtain more level states. The driving signal of the power conversion circuit may be set with different duty cycles D in different grid frequency cycles. For example, when three three-level bridge arms are used, the duty cycles may be set to D≤⅓, ⅓≤D≤⅔, and ⅔≤D≤1, so as to obtain seven level states.

It can be seen from the embodiment in FIG. 4 that V_o=(V_1+V_2+V_3)/3. According to the time-varying different level states of V_1, V_2 and V_3, different output voltages V_o of the power conversion circuit may be obtained in the positive half and negative half of the grid frequency cycle of the driving signal, as shown in Table 2.

TABLE 2

Variations of V_o under different duty cycle states with output voltages of different three-level bridge arms

| Duty cycle state | V_1 | V_2 | V_3 | V_o |
|---|---|---|---|---|
| ⅔≤ D ≤ 1 | Vbus/2 | Vbus/2 | Vbus/2 | Vbus/2 |
| ⅓≤ D ≤ ⅔ | Vbus/2 | Vbus/2 | 0 | Vbus/3 |
| 0 ≤ D ≤ ⅔ | Vbus/2 | 0 | 0 | Vbus/6 |
| 0 ≤ D ≤ ⅓ | 0 | 0 | 0 | 0 |
| 0 ≤ D ≤ ⅔ | −Vbus/2 | 0 | 0 | −Vbus/6 |
| ⅓≤ D ≤ ⅔ | −Vbus/2 | −Vbus/2 | 0 | −Vbus/3 |
| ⅔≤ D ≤ 1 | −Vbus/2 | −Vbus/2 | −Vbus/2 | −Vbus/2 |

The output voltage V_o of the power converter varies with different states of a duty cycle in the entire grid frequency cycle, as shown in FIG. 2. In the positive half, if the state (or variation range) of the duty cycle is ⅔≤D≤1, V_o is Vbus/2; and in the negative half, if the state of the duty cycle is ⅔≤D≤1, V_o is −Vbus/2.

Referring to FIG. 7, the following is described by using the positive half of the grid frequency cycle as an example. As the duty cycle D changes, the combined states of V_1, V_2, and V_3 are separately as follows:

When the duty cycle D≤⅓, the output voltage V_o is 0 or Vbus/6; when ⅓≤D≤⅔, the output voltage V_o is Vbus/6 or Vbus/3; and when ⅔≤D≤1, the output voltage V_o is Vbus/3 or Vbus/2.

Therefore, in the positive half of the grid frequency cycle, as the duty cycle D changes, 4 levels are generated: 0, Vbus/6, Vbus/3 and Vbus/2; and similarly, in the negative half of the grid frequency cycle, 4 levels may be obtained: 0, −Vbus/6, −Vbus/3 and −Vbus/2. Therefore, 7 level states in total are generated in the grid frequency cycle. According to the embodiment of the present invention, if, in the entire grid frequency cycle, the duty cycle varies from 0 to ⅔, an effect of 5 levels can be generated. Therefore it can be seen that the output states of the multiple levels of the third terminal depend on the state or variation range of the duty cycle.

In addition, a leakage inductance Lcm of the coupling inductor 640 in coordination with the filter circuit 650 may achieve a purpose of output filtering, which can spare an inductance in the filter circuit. Therefore, the filter circuit 650 may only include a capacitor. Because the filter circuit 650 only needs a capacitor to achieve a good effect of filtering, the cost of the output filter circuit 650 is reduced, thereby facilitating the suppression of output harmonics. In addition, because the three multi-level bridge arms work in an interleaved manner, a high frequency component in the output of a multi-level bridge arm changes at 3 times the switching frequency. In other words, V_1 changes at the switching frequency, and a change frequency of V_o is 3 times that of V_1, which can increase a cut-off frequency of high-order harmonics and reduce the cost of the filter circuit, thereby facilitating the design of a post-filter circuit.

Figure 8:
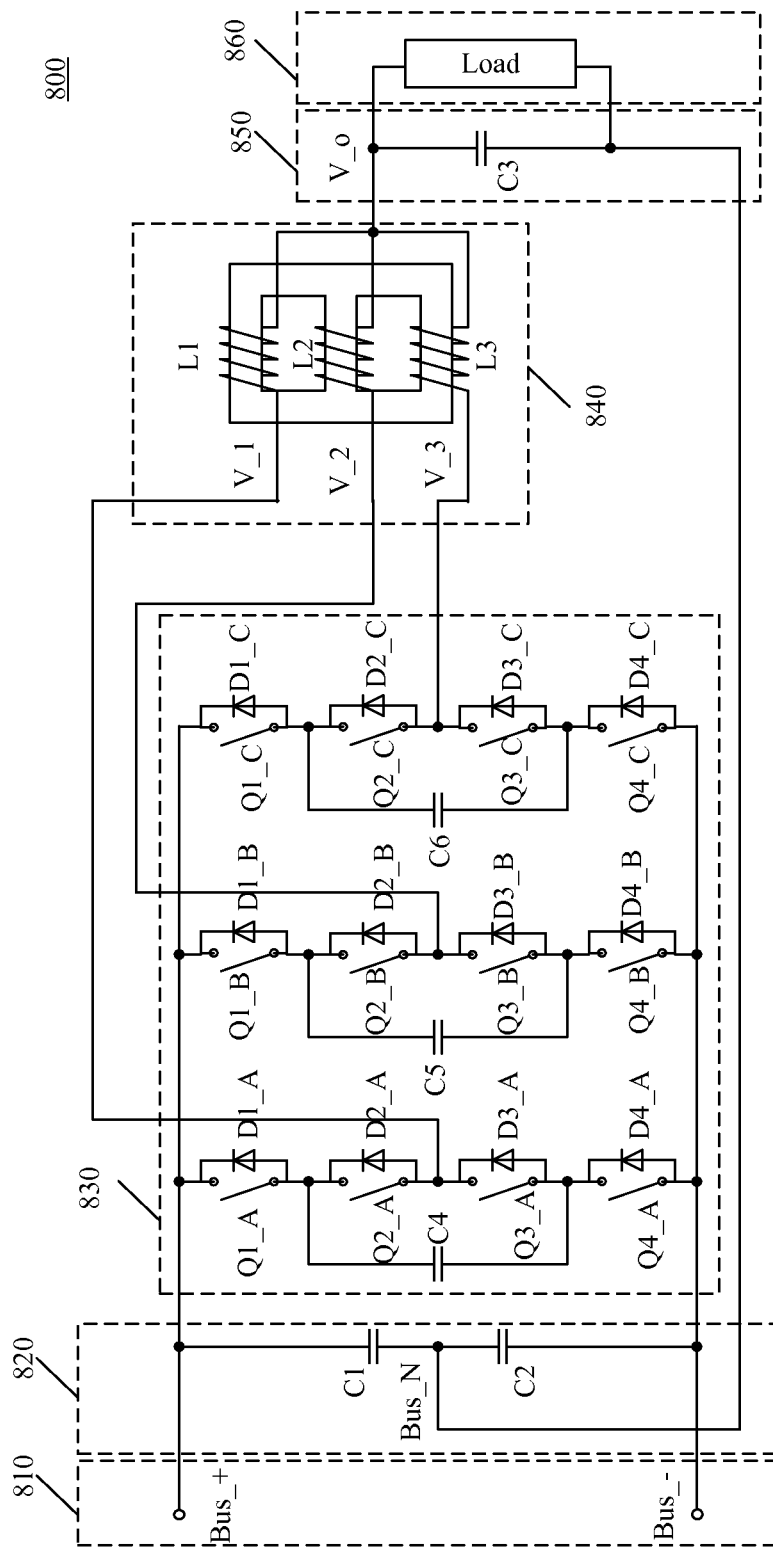
FIG. 8 is a circuit diagram of a power conversion circuit according to another embodiment of the present invention.

FIG. 8 is a circuit diagram of a power conversion circuit 800 according to another embodiment of the present invention. The power conversion circuit 800 is an example of the embodiment in FIG. 1, FIG. 2 or FIG. 3.

This embodiment is described by using an example that a power conversion circuit is a power inverter circuit and the power inverter circuit includes three capacitor-clamped three-level bridge arms. Accordingly, a coupling inductor also has three windings, but the embodiment of the present invention is not limited thereto. For example, the power conversion circuit 800 may also include two three-level bridge arms or more three-level bridge arms. A circuit topology of the power conversion circuit which includes another number of three-level bridge arms is similar to a circuit topology of the power conversion circuit which includes three three-level bridge arms, and therefore is not further described herein.

The power conversion circuit 800 includes a direct current bus (Bus) 810, a bleeder circuit 820, three three-level bridge arms 830, a coupling inductor 840 and a filter circuit 850.

A first terminal of the power conversion circuit 800 is connected to an anode (Bus_+) of the direct current bus, and a second terminal of the power conversion circuit 800 is connected to a cathode (Bus_−) of the direct current bus.

The bleeder circuit includes a first capacitor C1 and a second capacitor C2, where the first capacitor C1 is connected between the Bus_+ and a neutral point Bus_N of the bleeder circuit, and the second capacitor C2 is connected between the Bus_− and the Bus_N.

The three three-level bridge arms 830 include a three-level bridge arm A, a three-level bridge arm B and a three-level bridge arm C. Each three-level bridge arm includes a first switching tube, a second switching tube, a third switching tube and a fourth switching tube, as well as a first diode connected in parallel with the first switching tube, a second diode connected in parallel with the second switching tube, a third diode connected in parallel with the third switching tube and a fourth diode connected in parallel with the fourth switching tube. An alternating current node of each three-level bridge arm is connected to a corresponding winding of the coupling inductor.

In each three-level bridge arm, the first switching tube Q1 and the second switching tube Q2 are connected in series between the Bus_+ of the direct current bus and the alternating current node of the three-level bridge arm; the third switching tube Q3 and the fourth switching tube Q4 are connected in series between the Bus_− of the direct current bus and the alternating current node of the three-level bridge arm; a cathode of the first diode is connected to the Bus_+, a cathode of the second diode is connected to an anode of the first diode, an anode of the fourth diode is connected to the Bus_−, an anode of the third diode is connected to a cathode of the fourth diode; a capacitor for clamping (for example, a flying capacitor) is bridged between the anode of the first diode and the cathode of the fourth diode.

The windings of the coupling inductor 840 share one magnetic core, where the magnetic core includes three cylinders, where two ends of each of the three cylinders are separately connected magnetically, the three windings wind respectively around the three cylinders in a same winding direction, three head ends of the three windings are connected respectively to the alternating current nodes of the three three-level bridge arms, and three tail ends of the three windings are connected to a third terminal of the power conversion circuit.

The filter circuit 850 may be a capacitor C3. The capacitor C3 is connected between the third terminal of the power conversion circuit and the neutral point of the bleeder circuit 820. However, the embodiment of the present invention is not limited thereto. For example, the filter circuit 850 may also be an LC filter circuit which is formed by an inductor and a capacitor or other forms of filter circuits. The filter circuit 850 is connected to an alternating current load 860.

It should be understood that, when the power conversion circuit 800 is a rectifier, the filter circuit 850 is connected to an alternating current power supply (not shown), that is, the filter circuit 850 receives an alternating current input.

Figure 9:
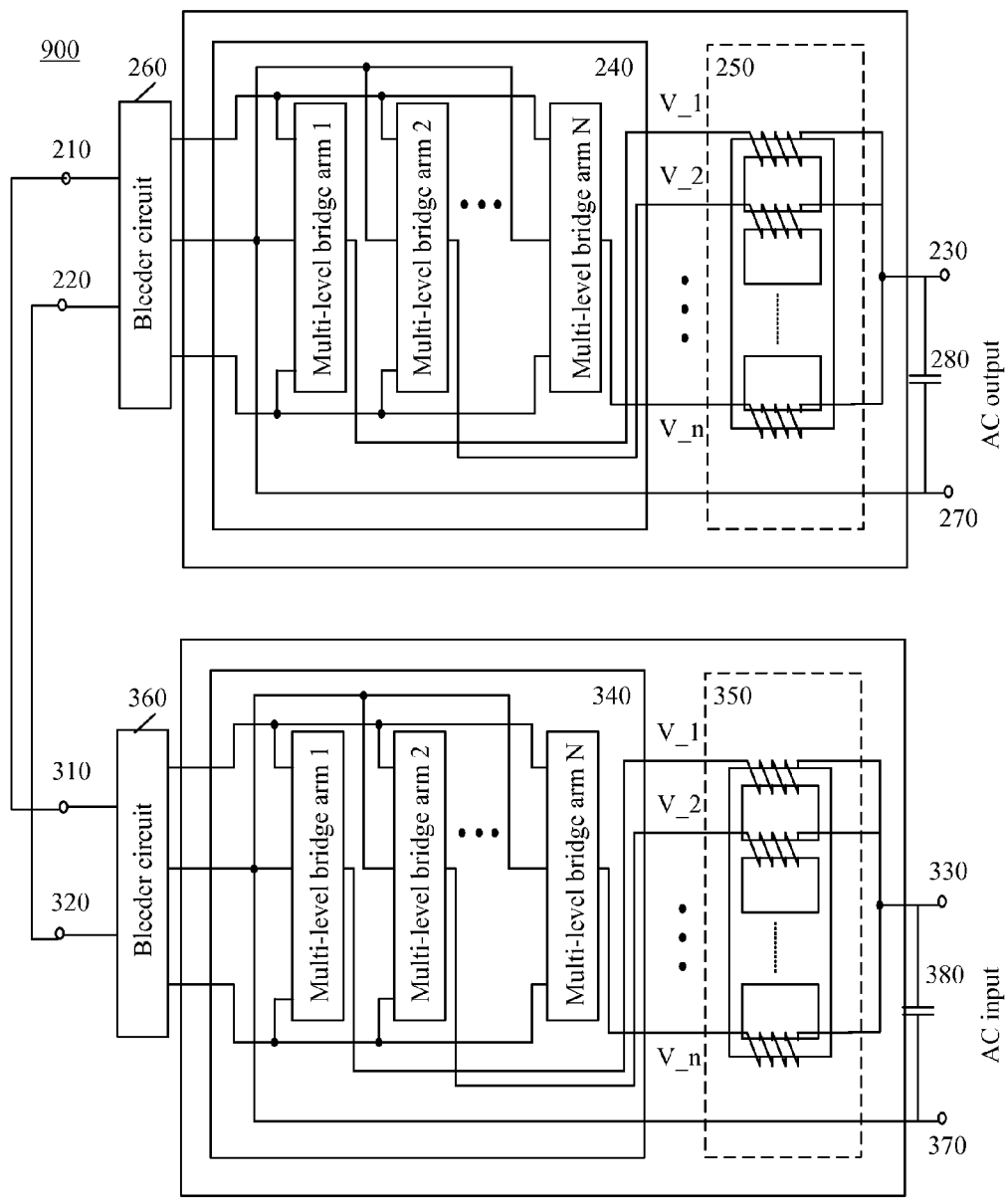
FIG. 9 is a schematic block diagram of a power conversion system according to an embodiment of the present invention.

FIG. 9 is a schematic block diagram of a power conversion system 900 according to an embodiment of the present invention. The power conversion system 900 includes a first power conversion circuit and a second power conversion circuit, which are configured to implement alternating current/alternating current (AC/AC) conversion. The first power conversion circuit may be the power conversion circuit 200 shown in FIG. 2, which is configured to convert a direct current into an alternating current. The second power conversion circuit may be the power conversion circuit 300 shown in FIG. 3, which is configured to convert an alternating current to a direct current. An input terminal of the power conversion circuit 200 is connected to an output terminal of the power conversion circuit 300. In other words, a direct current output of the second power conversion circuit is connected to a direct current input of the first power conversion circuit, so as to implement AC/AC conversion.

By using parallel-interleaved multi-level bridge arms in combination with a coupling inductor, more levels can be output. Because the multiple multi-level bridge arms can increase output levels in a phase-interleaved working manner, the control logic of a power conversion circuit is simplified. Moreover, because in the embodiment of the present invention, the number of alternating current levels can be increased, the proportion of high-order harmonics in an alternating current is reduced, thereby suppressing the high-order harmonics effectively. In addition, because the high-order harmonics are suppressed effectively, it is unnecessary to perform filtering by using a larger filter circuit, thereby reducing the cost of the filter circuit. In addition, by connecting the direct current output of the second power conversion circuit to the direct current input of the first power conversion circuit, AC/AC conversion is implemented.

Figure 10:
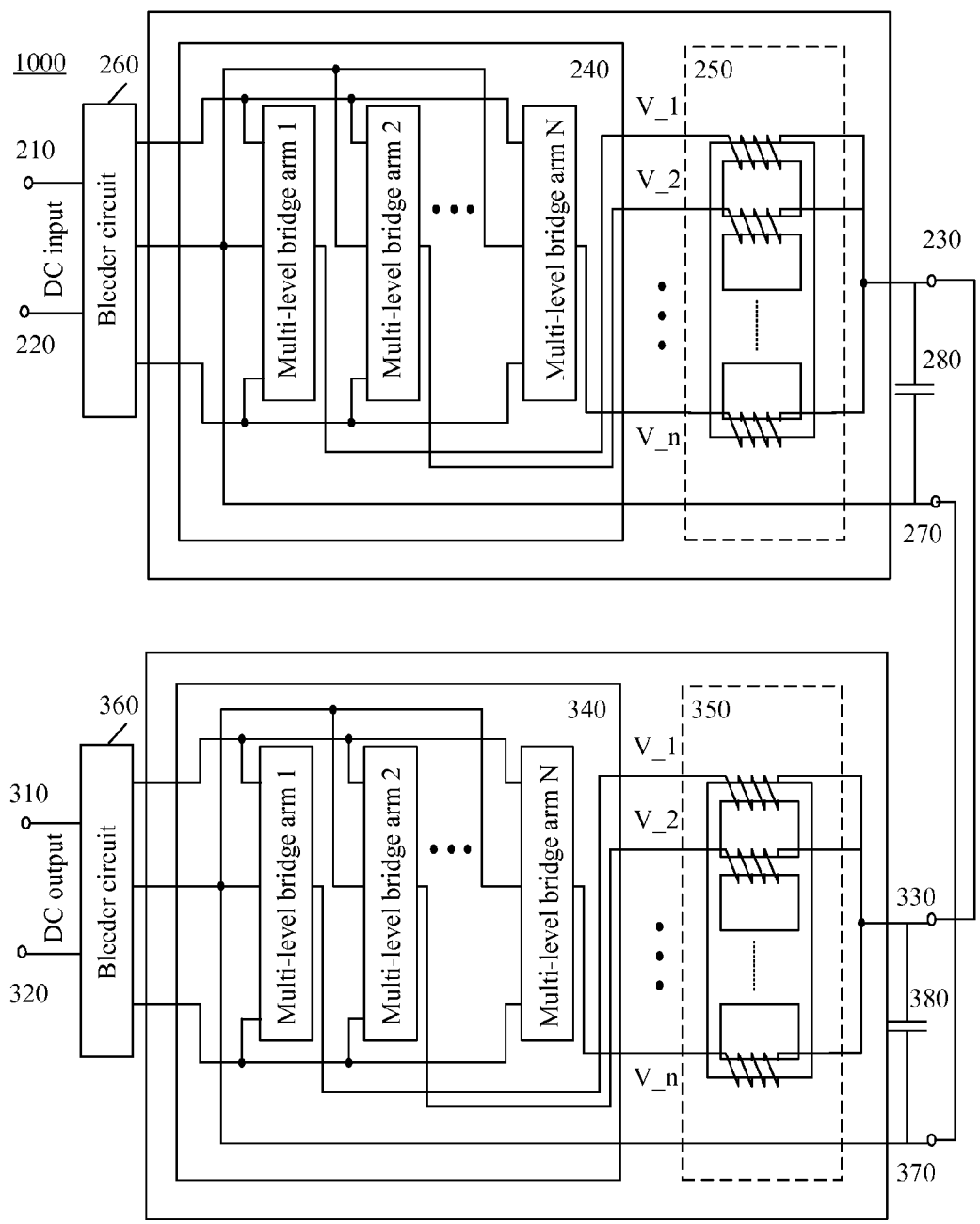
FIG. 10 is a schematic block diagram of a power conversion system according to another embodiment of the present invention.

FIG. 10 is a schematic block diagram of a power conversion system 1000 according to another embodiment of the present invention. The power conversion system 1000 includes a first power conversion circuit and a second power conversion circuit, which are configured to implement direct current/direct current (DC/DC) conversion. The first power conversion circuit may be the power conversion circuit 200 shown in FIG. 2, which is configured to convert a direct current into an alternating current. The second power conversion circuit may be the power conversion circuit 300 shown in FIG. 3, which is configured to convert an alternating current to a direct current. An output terminal of the power conversion circuit 200 is connected to an input terminal of the power conversion circuit 300. In other words, an alternating current output of the first power conversion circuit is connected to an alternating current input of the second power conversion circuit, so as to implement DC/DC conversion.

By using parallel-interleaved multi-level bridge arms in combination with a coupling inductor, more levels can be output. Because the multiple multi-level bridge arms can increase output levels in a phase-interleaved working manner, the control logic of a power conversion circuit is simplified. Moreover, because in the embodiment of the present invention, the number of alternating current levels can be increased, the proportion of high-order harmonics in an alternating current is reduced, thereby suppressing the high-order harmonics effectively. In addition, because the high-order harmonics are suppressed effectively, it is unnecessary to perform filtering by using a larger filter circuit, thereby reducing the cost of the filter circuit. In addition, by connecting the alternating current output of the first power conversion circuit to the alternating current input of the second power conversion circuit, DC/DC conversion is implemented.

Figure 11:
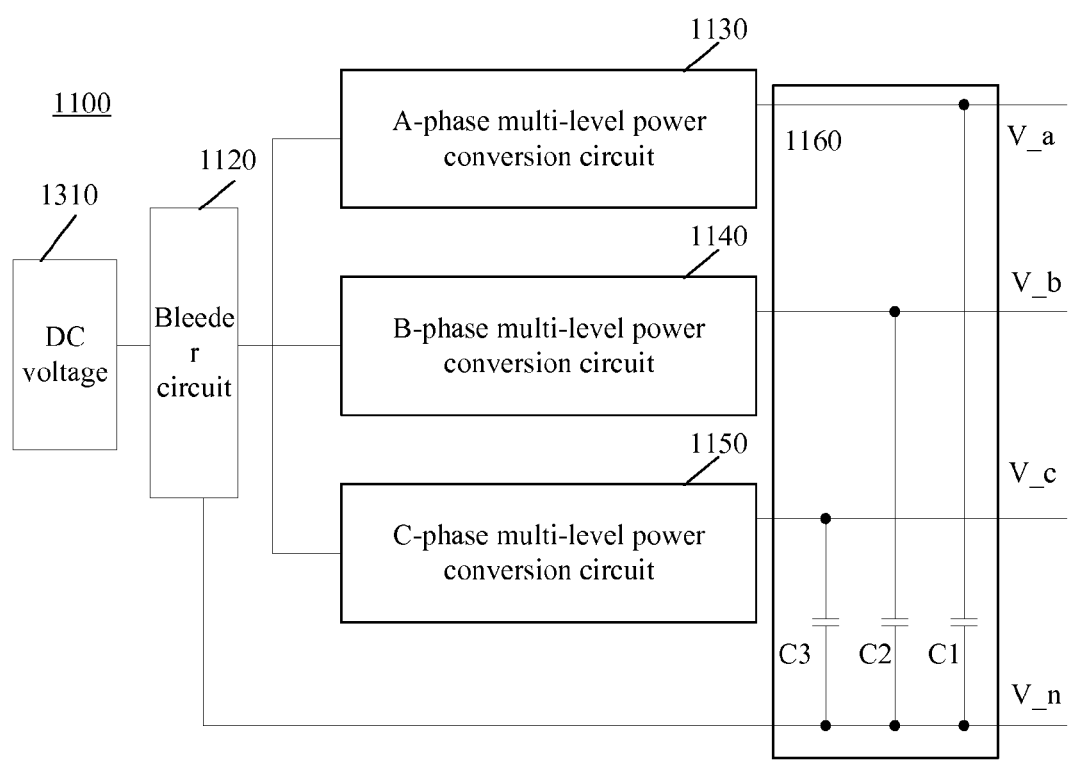
FIG. 11 is a schematic block diagram of a three-phase power converter according to an embodiment of the present invention.

FIG. 11 is a schematic block diagram of a three-phase power converter 1100 according to an embodiment of the present invention. The three-phase power converter 1100 includes: an A-phase multi-level power conversion circuit 1130, a B-phase multi-level power conversion circuit 1140 and a C-phase multi-level power conversion circuit 1150, which are configured to implement power conversion between a three-phase alternating current and a direct current.

Each phase of power conversion circuit of the A-phase multi-level power conversion circuit 1130, the B-phase multi-level power conversion circuit 1140, and the C-phase multi-level power conversion circuit 1150 is the power conversion circuit 100 shown in FIG. 1.

In the embodiment of the present invention, by using parallel-interleaved multi-level bridge arms in combination with a coupling inductor at each phase of power conversion circuit of the three-phase power converter, more levels of a three-phase alternating current output can be generated. Because the multiple multi-level bridge arms can increase output levels in a phase-interleaved working manner, the control logic of a power conversion circuit is simplified. Moreover, because in the embodiment of the present invention the number of alternating current levels can be increased, the proportion of high-order harmonics in an alternating current is reduced, thereby suppressing the high-order harmonics effectively. In addition, because the high-order harmonics are suppressed effectively, it is unnecessary to perform filtering by using a larger filter circuit, thereby reducing the cost of the filter circuit.

Optionally, as another embodiment, the three-phase power converter 1100 further includes a bleeder circuit 1120 and a three-phase filter circuit 1160. The bleeder circuit 1120 is connected between a first terminal and a second terminal of each phase of power conversion circuit, and configured to bleed down a voltage of a direct current. The three-phase filter circuit 1160 includes: an A-phase filter capacitor C1, a B-phase filter capacitor C2 and a C-phase filter capacitor C3, which are configured to filter a three-phase alternating current, where one end of each capacitor of the three capacitors is connected to a third terminal of one phase of power conversion circuit of the three-phase power conversion circuit, and the other ends of the three capacitors are connected together. The three-phase power converter 1100 may be a three-phase power inverter, which is configured to receive an input direct current voltage 1110, and output three phases of alternating current voltages V_a, V_b and V_c after inversion.

It should be understood that the three-phase power converter 1100 may also be a three-phase power rectifier, which is configured to receive three phases of input alternating current voltages V_a, V_b and V_c, and output a direct current voltage after rectification.

Figure 12:
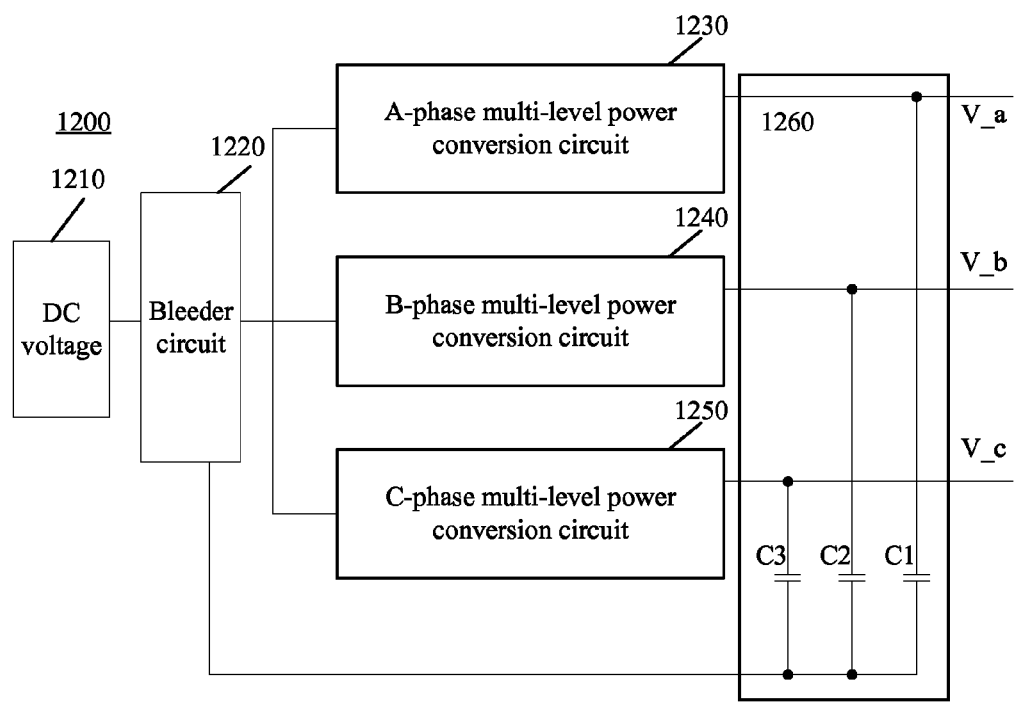
FIG. 12 is a schematic block diagram of a three-phase power converter according to another embodiment of the present invention.

FIG. 12 is a schematic block diagram of a three-phase power converter 1200 according to another embodiment of the present invention. The three-phase power converter 1200 includes an A-phase multi-level power conversion circuit 1230, a B-phase multi-level power conversion circuit 1240, a C-phase multi-level power conversion circuit 1250, a bleeder circuit 1220 and a three-phase filter circuit 1260, which are similar to the A-phase multi-level power conversion circuit 1130, the B-phase multi-level power conversion circuit 1140, the C-phase multi-level power conversion circuit 1150, the bleeder circuit 1120 and the three-phase filter circuit 1160 of the three-phase power converter 1100A in FIG. 11, and therefore are not further described herein. Unlike the embodiment in FIG. 11, the other end of each capacitor of the three-phase filter capacitor C1, the B-phase filter capacitor C2 and the C-phase filter capacitor C3 in the three-phase power converter 1200 in FIG. 12 is connected together to a neutral point of the bleeder 1220.

In the embodiment of the present invention, parallel-interleaved multi-level bridge arms are used in combination with a coupling inductor at each phase of power conversion circuit of the three-phase power converter. Because the multiple multi-level bridge arms can increase output levels in a phase-interleaved working manner, the control logic of a power conversion circuit is simplified. Moreover, because in the embodiment of the present invention, the number of alternating current levels can be increased, the proportion of high-order harmonics in an alternating current is reduced, thereby suppressing the high-order harmonics effectively. In addition, because the high-order harmonics are suppressed effectively, it is unnecessary to perform filtering by using a larger filter circuit, thereby reducing the cost of the filter circuit.

The three-phase power converter 1200 may be a three-phase power inverter, which is configured to receive an input direct current voltage 1210, and output three phases of alternating current voltages V_a, V_b and V_c after inversion.

It should be understood that the three-phase power converter 1200 may also be a three-phase power rectifier, which is configured to receive three phases of input alternating current voltages V_a, V_b and V_c, and output a direct current voltage after rectification.

Figure 13:
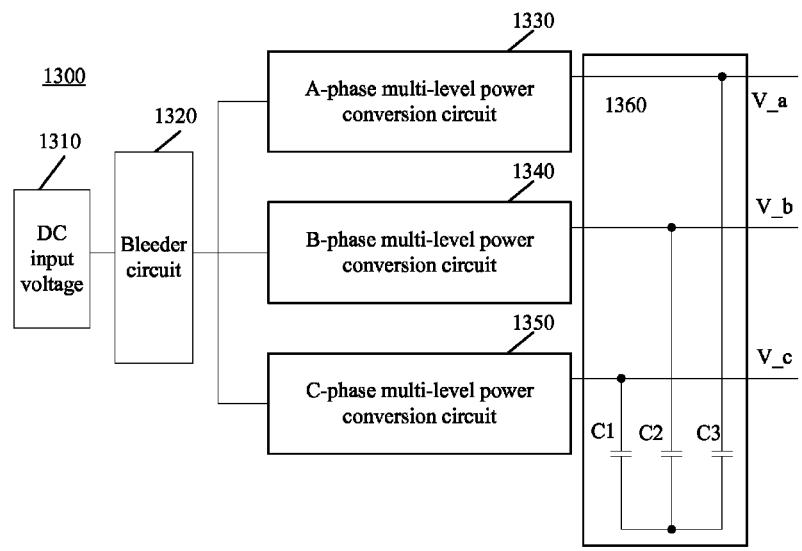
FIG. 13 is a schematic block diagram of a three-phase power converter according to still another embodiment of the present invention.

FIG. 13 is a schematic block diagram of a three-phase power converter 1300 according to still another embodiment of the present invention. The three-phase power converter 1300 is similar to the three-phase power converter 1200 in FIG. 12, and the three-phase power converter 1300 includes an A-phase multi-level power conversion circuit 1330, a B-phase multi-level power conversion circuit 1340, a C-phase multi-level power conversion circuit 1350, a bleeder circuit 1320 and a three-phase filter circuit 1360, which are similar to the A-phase multi-level power conversion circuit 1230, the B-phase multi-level power conversion circuit 1240, the C-phase multi-level power conversion circuit 1250, the bleeder circuit 1220 and the three-phase filter circuit 1260 of the three-phase power converter 1200 in FIG. 12, and therefore are not further described herein. Unlike the embodiment in FIG. 12, the three-phase power converter 1300 further includes a first neutral N, which is configured to connect to a neutral of a grid, where the first neutral is connected to an end of each capacitor of the three-phase filter capacitor C1, the B-phase filter capacitor C2 and the C-phase filter capacitor C3 that is connected together. The three-phase power converter 1300 may be a three-phase power inverter, which is configured to receive an input direct current voltage 1310, and output three phases of alternating current voltages V_a, V_b and V_c after inversion.

In the embodiment of the present invention, by using parallel-interleaved multi-level bridge arms in combination with a coupling inductor at each phase of power conversion circuit of the three-phase power converter, more levels of a three-phase alternating current output can be generated. Because the multiple multi-level bridge arms can increase output levels in a phase-interleaved working manner, the control logic of a power conversion circuit is simplified. Moreover, because in the embodiment of the present invention, the number of alternating current levels can be increased, the proportion of high-order harmonics in an alternating current is reduced, thereby suppressing the high-order harmonics effectively. In addition, because the high-order harmonics are suppressed effectively, it is unnecessary to perform filtering by using a larger filter circuit, thereby reducing the cost of the filter circuit.

It should be understood that the three-phase power converter 1300 may also be a three-phase power rectifier, which is configured to receive three phases of input alternating current voltages V_a, V_b and V_c, and output a direct current voltage after rectification.

Figure 14:
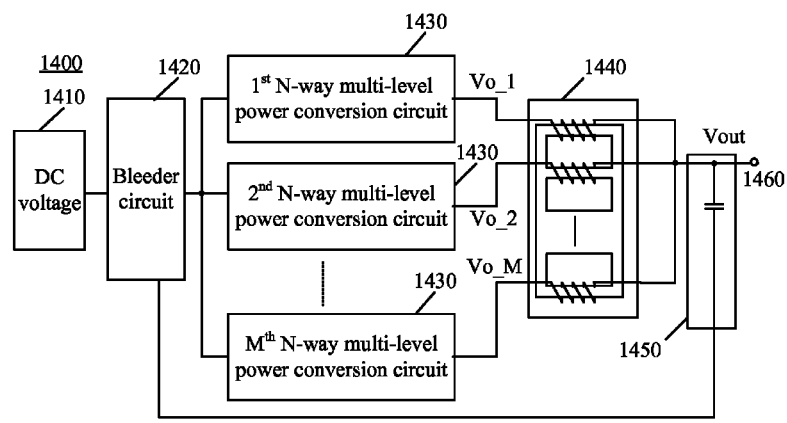
FIG. 14 is a schematic block diagram of a power conversion system according to another embodiment of the present invention.

FIG. 14 is a schematic block diagram of a power conversion system 1400 according to another embodiment of the present invention. The power conversion system 1400 includes: a bleeder circuit 1420, M power conversion circuits 1430, a coupling inductor 1440, a filter circuit 1450 and a fourth terminal 1460.

This embodiment is described by using an example that a coupling inductor is two-level, but a person skilled in the art can understand that the coupling inductor may also be multi-level. The two-level coupling inductor includes: a coupling inductor in each power conversion circuit 1430 and the coupling inductor 1440 shared by the M power conversion circuits 1430.

The coupling inductor 1440 is similar to the coupling inductor in FIG. 4, and therefore is not further described herein.

Each power conversion circuit of the M power conversion circuits 1430 is the power conversion circuit 100 shown in FIG. 1, which is configured to perform power conversion between an alternating current and a direct current, which is not further described herein. The bleeder circuit 1420 is connected between a first terminal and a second terminal of each power conversion circuit of the M power conversion circuits 1430, and configured to bleed down a voltage of the direct current. The coupling inductor 1440 includes M windings coupled by one common magnetic core, and is configured to form inductances coupled with each other, where one end of each winding of the M windings is connected to a third terminal of one power conversion circuit of the M power conversion circuits 1430, and the other end of each winding of the M windings is connected to the fourth terminal 1460. The filter circuit 1450 is connected to the fourth terminal 1460, and configured to filter the alternating current, where M is greater than or equal to two.

According to the embodiment of the present invention, the M power conversion circuits may be connected together by using a coupling inductor and work in a parallel-interleaved manner, so as to output more levels, thereby further extending the total power.

According to the embodiment of the present invention, the filter circuit 1450 includes a capacitor connected to the fourth terminal. As a leakage inductance generated by the coupling inductor may be used for filtering, it is unnecessary to set an inductance in the filter circuit, which can reduce the cost of the filter circuit of the three-phase power converter.

According to the embodiment of the present invention, N multi-level bridge arms of each power conversion circuit of the M power conversion circuits 1430 work in a parallel-interleaved way in a 360/(N*M)-degree-phase-interleaved manner within a switching cycle of a driving signal of the power conversion circuit. In other words, phases of a driving signal of each power conversion circuit are spaced by 360/M degrees, and phases of driving signals of the N multi-level bridge arms of each power conversion circuit are spaced by 360/(N*M) degrees.

In the embodiment according to the present invention, compared with a solution in which multiple levels are generated by using two levels in combination with a coupling inductor, in a case of same output levels, the number of coupling inductors is reduced and the design and the production of a coupling inductor are simplified, thereby reducing the cost.

A person of ordinary skill in the art may be aware that, units and algorithm steps described with reference to the examples described in the embodiments disclosed in this specification may be implemented by electronic hardware, computer software, or a combination thereof. To clearly describe the interchangeability between hardware and software, the foregoing has generally described compositions and steps of each example according to functions. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

The method or algorithm steps described with reference to the embodiments disclosed in this specification may be implemented by hardware, a software module executed by a processor, or a combination thereof. The software module may be arranged in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Although some embodiments of the present invention are shown and described, a person skilled in the art should understand that various modifications can be made to the embodiments without departing from the principle of the present invention, and such modifications shall fall within the scope of the present invention.

What is claimed is:

1. A power conversion circuit, comprising:
a first terminal and a second terminal, which are configured to connect to a direct current;
a third terminal, configured to connect to an alternating current;
N multi-level bridge arms, connected in parallel between the first terminal and the second terminal, and configured to work in a phase-interleaved manner so as to generate multiple time-varying levels at an alternating current node of each multi-level bridge arm of the N multi-level bridge arms, wherein the multiple time-varying levels for each alternating current node comprise more than two levels, and wherein N is an integer greater than or equal to three;
a coupling inductor, comprising N windings coupled by one common magnetic core, and configured to form inductances coupled with each other, wherein one end of each winding of the N windings is connected to a corresponding alternating current node of one multi-level bridge arm of the N multi-level bridge arms, and the other end of each winding of the N windings is connected to the third terminal;
a driving circuit, configured to generate driving signals to control the N multi-level bridge arms to work in a 360/N-degree-phase-interleaved manner within a switching cycle of the driving signal of the power conversion circuit, wherein phases of driving signals for adjacent multi-level bridge arms of the N multi-level bridge arms are spaced by a same angle, wherein the phase spacing angle corresponds to 360/N degrees;

a bleeder circuit, connected between the first terminal and the second terminal, and configured to bleed down a voltage of the direct current; and a filter circuit, configured to filter the alternating current, wherein the filter circuit comprises a capacitor, wherein one end of the capacitor is connected to the third terminal and the other end of the capacitor is connected to a neutral point of the bleeder circuit, wherein the neutral point of the bleeder circuit is connected to the N multi-level bridge arms.

2. The power conversion circuit according to claim 1, wherein the common magnetic core comprises N interconnected cylinders, and the N windings wind around the N cylinders respectively in a same winding direction.

3. The power conversion circuit according to claim 1, wherein the N windings have the same number of turns.

4. The power conversion circuit according to claim 1, wherein the driving signals have a duty cycle within multiple preset ranges.

5. The power conversion circuit according to claim 1, wherein the multi-level bridge arms are M-level bridge arms, and the N multi-level bridge arms generate (M−1)*N+1 levels.

6. The power conversion circuit according to claim 1, wherein each multi-level bridge arm of the N multi-level bridge arms is a neutral-point-clamped multi-level bridge arm; and wherein the neutral point of the bleeder circuit is connected to a clamped neutral point of each multi-level bridge arm of the N multi-level bridge arms.

7. The power conversion circuit according to claim 1, wherein the multi-level bridge arms are capacitor-clamped multi-level bridge arms.

8. A three-phase power converter, comprising:

a three-phase power conversion circuit, configured to perform power conversion between a three-phase alternating current and a direct current, wherein each phase of the three-phase power conversion circuit comprises:

a first terminal and a second terminal, which are configured to connect to a direct current;

a third terminal, configured to connect to an alternating current;

N multi-level bridge arms, connected in parallel between the first terminal and the second terminal, and configured to work in a phase-interleaved manner so as to generate multiple time-varying levels at an alternating current node of each multi-level bridge arm of the N multi-level bridge arms, wherein the multiple time-varying levels for each alternating current node comprise more than two levels, and wherein N is an integer greater than or equal to three;

a coupling inductor, comprising N windings coupled by one common magnetic core, and configured to form inductances coupled with each other, wherein one end of each winding of the N windings is connected to a corresponding alternating current node of one multi-level bridge arm of the N multi-level bridge arms, and the other end of each winding of the N windings is connected to the third terminal; and a driving circuit, configured to generate driving signals to control the N multi-level bridge arms to work in a 360/N-degree-phase-interleaved manner within a switching cycle of the driving signal of the power conversion circuit, wherein phases of driving signals for adjacent multi-level bridge arms of the N multi-level bridge arms are spaced by a same angle, wherein the phase spacing angle corresponds to 360/N degrees;

a bleeder circuit, connected between the first terminal and the second terminal of each phase of the three-phase power conversion circuit, and configured to bleed down a voltage of the direct current; and a three-phase filter circuit, comprising three capacitors and configured to filter the three-phase alternating current, wherein one end of each capacitor of the three capacitors is connected to the third terminal of one phase of the three-phase power converter circuit, and the other ends of the three capacitors are connected together to a neutral point of the bleeder circuit, wherein the neutral point of the bleeder circuit is connected to each phase of the three-phase power conversion circuit.

9. The three-phase power converter according to claim 8, wherein the common magnetic core comprises N interconnected cylinders, and the N windings wind around the N cylinders respectively in a same winding direction.

10. The three-phase power converter according to claim 8, wherein the N windings have the same number of turns.

11. The three-phase power converter according to claim 8, wherein the driving signals have a duty cycle within multiple preset ranges.

12. The three-phase power converter according to claim 8, further comprising:

a first neutral, configured to connect to a neutral of a grid, wherein the first neutral is connected to the ends of the three capacitors that are connected together.

13. A power conversion system, comprising:

M power conversion circuits, configured to perform power conversion between an alternating current and a direct current, wherein each power conversion circuit of the M power conversion circuits comprises:

a first terminal and a second terminal, which are configured to connect to a direct current;

a third terminal, configured to connect to an alternating current;

N multi-level bridge arms, connected in parallel between the first terminal and the second terminal, and configured to work in a phase-interleaved manner so as to generate multiple time-varying levels at an alternating current node of each multi-level bridge arm of the N multi-level bridge arms, wherein the multiple time-varying levels for each alternating current node comprise more than two levels, and wherein N is an integer greater than or equal to three; and a coupling inductor, comprising N windings coupled by one common magnetic core, and configured to form inductances coupled with each other, wherein one end of each winding of the N windings is connected to a corresponding alternating current node of one multi-level bridge arm of the N multi-level bridge arms, and the other end of each winding of the N windings is connected to the third terminal; and a driving circuit, configured to generate driving signals to control the M power conversion circuits to work in a 360/(N*M)-degree-phase-interleaved manner within a switching cycle of the driving signal of the power conversion circuit, wherein phases of driving signals for adjacent multi-level bridge arms of the N multi-level bridge arms of the M power conversion circuits are spaced by a same angle, wherein the phase spacing angle corresponds to 360/(N*M) degrees;

a bleeder circuit, connected between the first terminal and the second terminal of each power conversion circuit of the M power conversion circuits, and configured to bleed down a voltage of the direct current;

a fourth terminal;

a coupling inductor, comprising M windings coupled by one common magnetic core, and configured to form inductances coupled with each other, wherein one end of each winding of the M windings is connected to the third terminal of one power conversion circuit of the M power conversion circuits, and the other end of each winding of the M windings is connected to the fourth terminal; and a filter circuit, connected to the fourth terminal and configured to filter the alternating current, wherein the filter circuit comprises a capacitor connected on one end to the fourth terminal and on the other end to a neutral point of the bleeder circuit, wherein the neutral point of the bleeder circuit is connected to each power conversion circuit of the M power conversion circuits;

wherein M is an integer greater than or equal to two.

* * * * *